United States Patent [19]

Wiener et al.

[11] Patent Number: 5,251,286
[45] Date of Patent: Oct. 5, 1993

[54] METHOD FOR ESTIMATING FORMATION PERMEABILITY FROM WIRELINE LOGS USING NEURAL NETWORKS

[75] Inventors: Jacky M. Wiener; Robert F. Moll, both of Englewood; John A. Rogers, Castle Rock, all of Colo.

[73] Assignee: Texaco, Inc., White Plains, N.Y.

[21] Appl. No.: 852,036

[22] Filed: Mar. 16, 1992

[51] Int. Cl.$^5$ .............................................. G06F 15/18
[52] U.S. Cl. ....................................... 395/22; 395/23; 364/422; 73/153
[58] Field of Search ............... 395/23, 24, 22; 73/153; 364/422

[56]  References Cited

U.S. PATENT DOCUMENTS

| | | | |
|---|---|---|---|
| 3,802,259 | 4/1974 | Eckels | 73/153 |
| 4,716,973 | 1/1988 | Cobern | 175/50 |
| 4,912,655 | 3/1990 | Wood | 395/23 |
| 4,961,343 | 10/1990 | Boone | 175/50 |
| 4,964,101 | 10/1990 | Liu et al. | 73/152 |
| 5,052,043 | 9/1991 | Gaborski | 395/23 |

OTHER PUBLICATIONS

Caudill, "Neural Network Training Tips and Techniques", AI Expert, Jan. 1991, pp. 56-61.
Reilly et al, "An Overview of Neural Networks: Early Models to Real World Systems", An Introduction to Neural and Electronic Networks, 1990, pp. 227-248.
Rumelhart et al, "Learning Internal Representations by Error Propagation", Parallel Distributed Processing, vol. 1, Foundations, Rumelhart & McClelland, 1986, pp. 318-362.
Lippmann, "Pattern Classification Using Neural Networks", IEEE Communications Magazine, Nov. 1989, pp. 47-64.
Baum, "On the Capabilities of Multilayer Perceptrons", Journal of Complexity, 4, 193-215, 1988.

*Primary Examiner*—Allen R. MacDonald
*Attorney, Agent, or Firm*—James L. Bailey; Jack H. Park; Russell J. Egan

[57] ABSTRACT

A method for determining rock formation permeability from wireline well logs utilizes neural networks. The neural networks provide consistency, accuracy and overall quality without bias to the calculations.

14 Claims, 5 Drawing Sheets

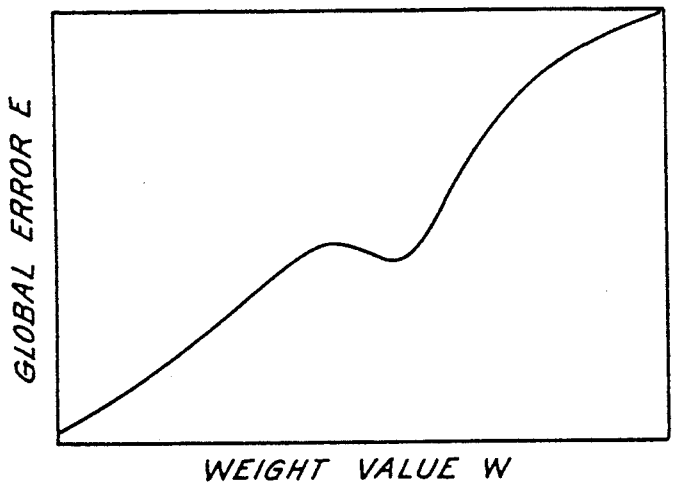
Fig. 3
Fig. 4
$$f(x) = tanh(x) = \frac{e^x - e^{-x}}{e^x + e^{-x}}$$
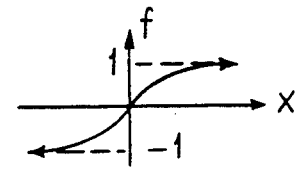
$$AND, \quad E = \frac{1}{2} \sum (dk - ok)^2$$
Fig. 5
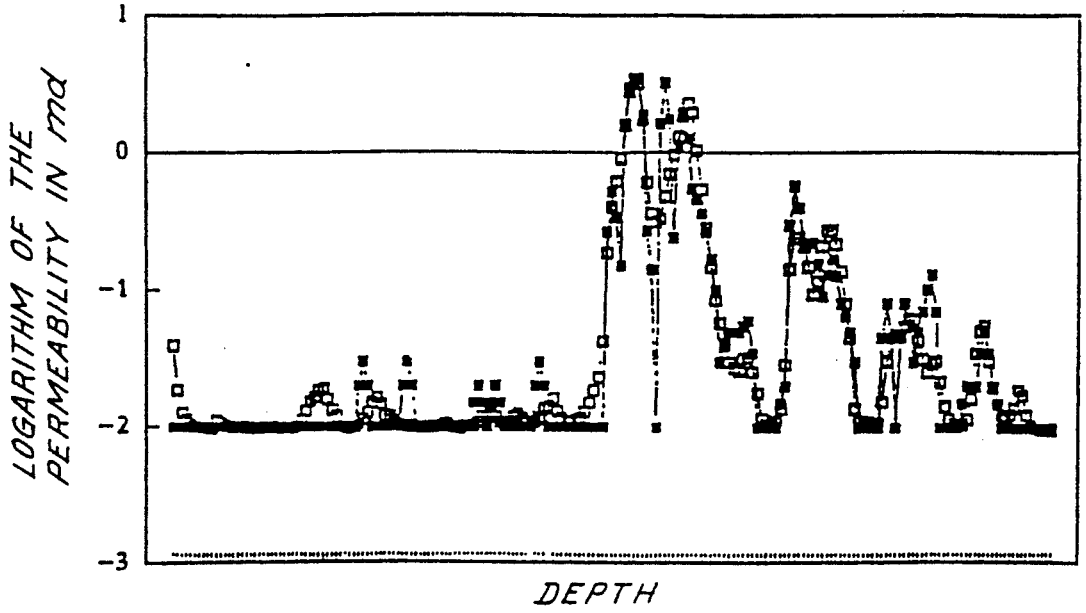
■ CORE DETERMINED PERMEABILITY
□ NETWORK DETERMINED PERMEABILITY

■ CORE DETERMINED PERMEABILITY
□ REGRESSION DETERMINED PERMEABILITY

METHOD FOR ESTIMATING FORMATION PERMEABILITY FROM WIRELINE LOGS USING NEURAL NETWORKS

BACKGROUND OF THE INVENTION

1. The Field of the Invention

The present invention relates to an improved method for analyzing wireline well log data resulting in a better estimation of formation permeability and, in particular, to a method using neural networks for determining rock formation permeability from wireline well logs.

2. The Prior Art

The permeability of rock formations is one of the most important and essential fluid flow parameters associated with the characterization and production of a given hydrocarbon reservoir. The permeability of a reservoir is fundamentally a measure of the interconnectedness of the available porosity which determines how easily fluid can pass through it. Permeability tends to be a function of the fluid type, pore size and distribution, flow direction, facies type, shale content, and hererogeneties such as non-connecting vugs and fractures. Permeability can also be highly variable, both vertically and horizontally. The importance of permeability to the oil and gas industry is demonstrated by its use as a parameter which determines whether or not a well should be completed for hydrocarbon production. Permeability is also critical in overall reservoir management and development, i.e. for choosing optimal drainage points, calculating production rates, determining completion and perforation intervals, designing enhanced oil recovery patterns, and evaluating injection conditions.

Many equations (Table 1) and statistical techniques have been developed to predict formation permeability from wireline logs or log-derived results, such as total porosity and irreducible water saturation. However, not one of these proposed techniques can be universally applied since a particular relationship in one oil field or geological formation cannot be extended to other oil fields. Also, these empirical relationships, even within a particular geologic regime, do not adequately solve for permeability when compared to the available core data. This may be due to the simplifying assumptions which are made about the relationship between reservoir porosity, irreducible water saturation and permeability; or it may be due to the fact that all of the logging measurements and their interrelationships are not being considered in these equations. Whatever the case, log-derived permeability has to-date been inadequate and, as a result, measured core permeability still remains the industry standard used to characterize hydrocarbon reservoirs. There is however, a problem in depending on core permeability as an input to reservoir description. Cores are very expensive to acquire and are not always readily available. Thus, if an accurate way of deriving permeability from wireline logs could be developed, it would be a very valuable tool in reservoir analysis and the development of petroleum reserves.

TABLE I

Tixier Equation $$K^{\frac{1}{2}} = 250 \frac{\phi^3}{S_{wi}}$$

Kozeny-Carman Equation

TABLE I-continued $$K = \frac{\phi^3}{5 S_g^2 (1 - \phi)^2}$$

Timur Equation $$K^{\frac{1}{2}} = 100 \frac{\phi^{2.25}}{S_{wi}}$$

Coates Equation $$K^{\frac{1}{2}} = 70 \frac{\phi_e^2 (1 - S_{wi})}{S_{wi}}$$

Coates-Dumanoir Equation $$K^{\frac{1}{2}} = \frac{300}{w^4} \frac{\phi^w}{S_{wi}^w}$$

SUMMARY OF THE INVENTION

Determination of formation permeability from wireline well logs can be accurately accomplished using neural network technology. Neural networks are pattern recognition tools that make use of parallel connections of simple non-linear functions. The simplifying assumptions and limitations required by current procedures are no longer necessary because the neural network learns the relationship between well log data and formation permeability. Additionally, once the network learns this relationship, it can accurately determine formation permeability throughout the geological province.

This invention concerns a method of accurately determining subsurface formation permeability from wireline well log data using neural networks. It comprises inputting the wireline well log measurements (resistivity, neutron porosity, bulk density, interval transit time, etc.) and the corresponding core permeability information into a specially designed backpropagation neural network for the training phase of the invention. What this means is that the neural network "learns" the appropriate core permeability response to a given set of corresponding wireline logs. Once trained, the neural network is then applied to other wireline log data in the area to produce formation permeability.

BRIEF DESCRIPTION OF THE DRAWINGS

The present invention will now be described, by way of example, with reference to the accompanying drawings in which:

FIG. 3 is a graphical representation of a cross section of the Global Error (E) in connection weight space;

FIG. 4 is the non-linear transfer function (Tanh) used in this invention;

FIG. 5 is a chart comparing the neural network derived permeability and measured core permeabilities;

DETAILED DESCRIPTION OF THE PRESENT INVENTION

The feasibility of using neural network technology to aid in the determination of permeability from wireline log measurements was established by the present inventors. Resistivity, sonic, neutron porosity, and density measurements were used as input to a specially designed neural network to predict permeabilities in carbonate reservoir rock. Neural network technology provides a method in which to improve the match between wire line log data and core plug permeabilities in carbonate rock. Conventional methods for determining permeability from log data make simplifying assumptions and do not make use of all of the relevant available data. For this reason, they have been unsuccessful in the prediction of permeability in all rocks except those with extremely simple pore structures. The application of neural networks to this problem overcomes these drawbacks.

Heretofore, the known methods for permeability estimation from conventional wireline logs have involved a number of empirical and statistical techniques which have not proven particularly accurate in rocks with complex pore geometries. These procedures would typically involve cross plotting porosity vs. permeability and establishing a "best fit" line to write a linear equation that would predict permeability from porosity. The problem with this approach is that the data scatter is extreme and this "best fit" line does not accurately explain the relationship. Other techniques involve empirical observations regarding porosity and irreducible water saturation combined in some manner to permeability. The problem with this approach is that this empirism cannot be applied elsewhere and deriving irreducible water saturation for a reservoir is difficult from logs. As a result, wireline log derived permeability has been inadequate and considered to be of limited value to the petroleum industry.

Figure 1:
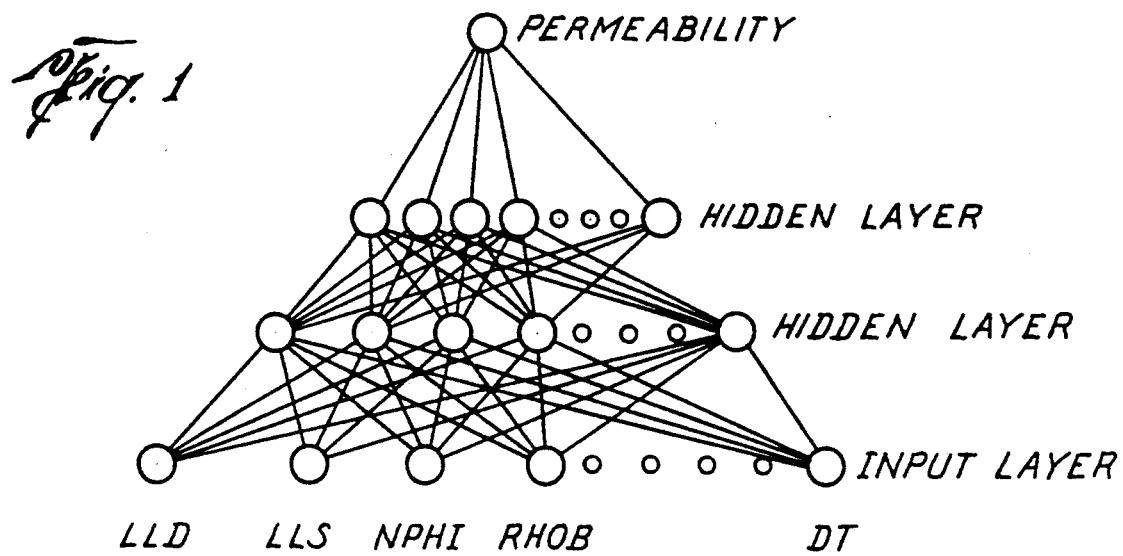
FIG. 1 is a schematic representation of the neural network architecture according to the present invention.

A different approach is employed in accordance with the present invention. For the present invention, highly accurate determination of formation permeability from wireline well logs is achieved through the use of neural networks. The neural network 10 (FIG. 1) is designed with four layers, an input layer 12 which contains the well log data, two intermediate or hidden layers 14, and an output layer 16 which contains the information to be learned (permeability). All of the layers are fully connected to one another. The network preferably contains eight input elements, sixteen hidden elements in two hidden layers, and one output element, $\log_{10}$ of permeability. It should be here noted that one skilled in the art may come up with many variations in the network design in order to achieve comparable results without departing from the spirit or essential characteristics of the present invention. For this example of the invention, the input variables included wireline resistivity, interval transit time, neutron porosity, bulk density, total porosity, water saturation, and bulk volume water.

Determination of appropriate inputs and their scaling are of utmost importance in the development of an appropriate data set within which to train a network. This invention chooses inputs based on log character and a determination by a trained log analyst of factors important to qualitatively determining permeability. For scaling purposes, the logarithm of the two resistivity logs are used rather than the straight values due to the wide range of resistivity values present in the well. It should be noted that an attempt was made to train networks with the above inputs, excluding the water saturation and bulk volume water, but it was found that the convergence time was prohibitively long. Since the water saturation and the bulk volume water add no new information, they merely serve to help the network converge.

These responses were used to "train" the neural network to recognize core permeability. During training, the neural network was given the wireline log data, asked to analyze it and predict the permeability. The predicted permeability was then compared with the measured core permeability and the connection weights were adjusted to minimize the difference between the predicted and actual permeability.

In backpropagation, the responsibility for reducing output error is shared among all of the connection weights. In this invention, the well known Delta Learning Rule is used for weight adjustment during learning. The global error function to be minimized is defined as $$E = 0.5 * \Sigma_k (D_k - O_k)^2 \qquad (1)$$

where the subscript k refers to the kth output node, $D_k$ is the desired output, and $O_k$ the actual output from the kth output node.

The global error is then redistributed throughout the network according to $$E_j^{(s)} = F'(I_j^{(s)}) * \Sigma_k (E_k^{(s-1)} * W_{kj}^{(s-1)}) \qquad (2)$$

where $E_j^{(s)}$ is the local error assigned to the jth node in the sth layer. The connection weights are then adjusted according to $$\Delta W_{jr} = lcoef \, E_j^{(s)} * X_i^{(s-1)} \qquad (3)$$

where $0 < lcoef < 1$ is the learning coefficient.

It is the connection weight values at the end of training that determine the quality of the network for formation permeability analysis.

Thus, using the above equations, and a functional form for the global error and for the transfer function, the weight vectors can be adjusted to minimize global error.

For a description of the hyperbolic tangent transfer function and the sum of squares global error function, see FIG. 4.

Figure 2:
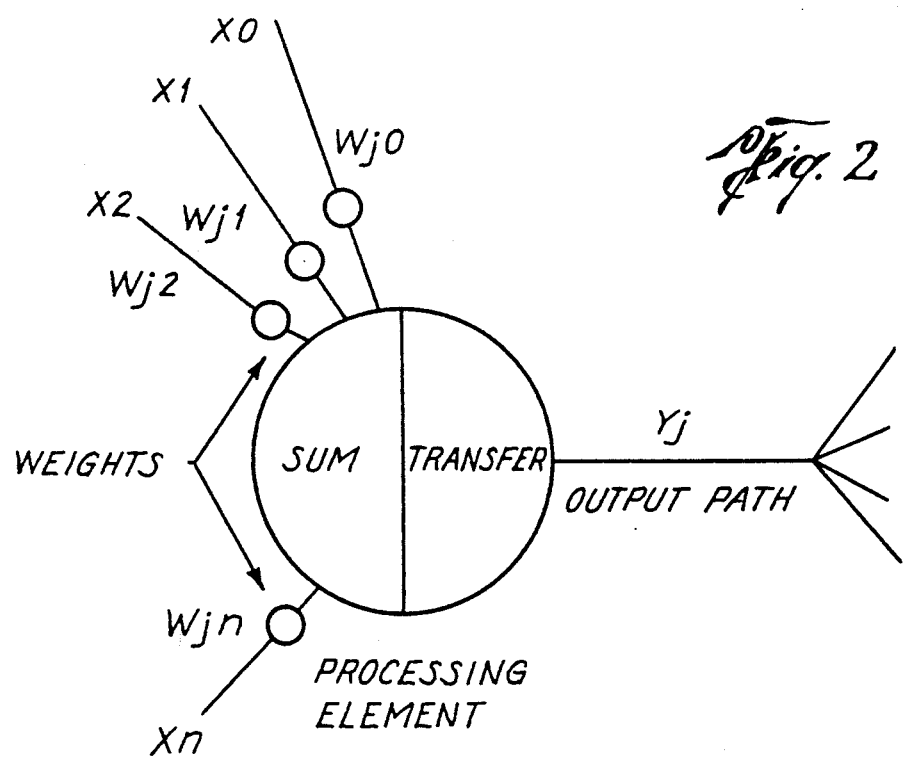
FIG. 2 is a schematic diagram of a neural processing element.

In sum, the network operates by first calculating an output vector from a given input vector based on the algorithm for data flow as outlined in FIG. 2. This output vector is compared to a desired output vector in order to determine the global error of the network. The definition of the local error at a processing element is then used to calculate the error associated with each processing element in the output layer. With equation (2), this error is "back-propagated" through the entire network so that, with the exception of those processing elements in the input layer, a value of local error is assigned to each processing element in the network. With the local errors defined, the weight matrix is updated using equation (3). This process is carried out for each input-output pair in the training data set in an iterative sense until the global error of the network drops below some acceptable threshold value. This phase of neural network implementation is called "training".

Once the network is trained, it is commonly tested on data that is not part of the training set but whose output is known in order to determine the reliability of the network. If the network produces accurate results from test data, then it is supplied with the data whose corresponding output is unknown.

There are several things to note about the way in which the network learns and operates. First, the gradient descent approach to minimizing E is acutely susceptible to local minima in E. However, there are several ways to reduce the possibility of being trapped in a local minima. One way that was used here works by simply adding to the right hand side of equation (3), a term of the form $$b\Delta(W_p)_{ji}^{[s]} \quad (4)$$

where $\Delta (W_p)_{ji}^{[s]}$ is the delta weight calculated in the previous iteration, and b is some user definable momentum coefficient. Clearly, this term acts to reduce the possibility of becoming stuck in a local minimum that might reside on the side of a steep slope of E, as plotted in weight space (FIG. 3). Note also that the addition of this momentum term can decrease the convergence time for a given learning coefficient. A second concern is that, by updating the weights after a single input-output pair has been presented, the error with respect to this pair is reduced, but the error associated with other pairs in the training set is not necessarily reduced. For this reason, cumulative update of weights is often used. That is, the delta weights for a user definable number of input-output pairs are added, and the actual update of the weights occurs only after this user definable number of pairs has been presented to the network.

Training of the neural network was done until the difference between the predicted and actual permeability reached an acceptable tolerance, usually after around 6,000 passes of the data. Once training of the neural network was completed, the network was then rigorously tested against permeability data from other wells, as well as other training data, to insure the accuracy of the results.

The procedure for deriving subsurface formation permeability from wireline well log data requires seven steps.

1. The conventional wireline well log data and corresponding core permeability data used in the training of the neural network is checked for quality and accuracy and, if necessary, corrected.

2. If necessary, the wireline well log data is depth shifted so that all the log data measurements and corresponding core data measurements are at the correct depth in the well.

3. Total porosity, water saturation and bulk volume are computed for input into the neural network using the resistivity, neutron porosity, bulk density, and sonic measurements. Also, the $log_{10}$ of the resistivity is computed for scaling purposes as an input into the neural network.

4. The average value of each log measurement is then calculated and subtracted from each log. The difference between the actual value and average value of each log is what is actually input into the neural network.

5. These data are then used to "train" the neural network to recognize the corresponding core permeability likely to be encountered in the study area. During the training process, the neural network is repeatedly given the log data from step 4 and asked to predict permeability. Node weights are adjusted and learning takes place. The training may be repeated to 6,000 iterations before acceptable levels of performance are achieved.

6. The trained network is then tested on wireline log data from other wells where permeability is known from core measurements. If performance is acceptable, the network can be applied to other well log data in the study area, step 7. If performance is unacceptable, training in step 5 must be reconfigured until acceptable performance is achieved.

7. Finally, the network is applied to processed well log data from other wells to accurately determine formation permeability.

This seven step procedure of network training using normalized wireline well log data and neural network application to the analysis of subsurface formation permeability for oil and gas field studies is demonstrably more accurate and very promising than is possible with the heretofore known practices.

This invention came about as a result of a study that was undertaken at one of Texaco's oil fields; Stockyard Creek in North Dakota. The Stockyard Creek field produces oil from the Mississippian age Mission Canyon Formation. The reservoir is a complex dolomite with many variations in permeability. The objective of this study was to determine the feasibility of using neural networks with wireline logs to unravel the permeability variations within this oil filed, as permeability is a key to production.

Figure 6:
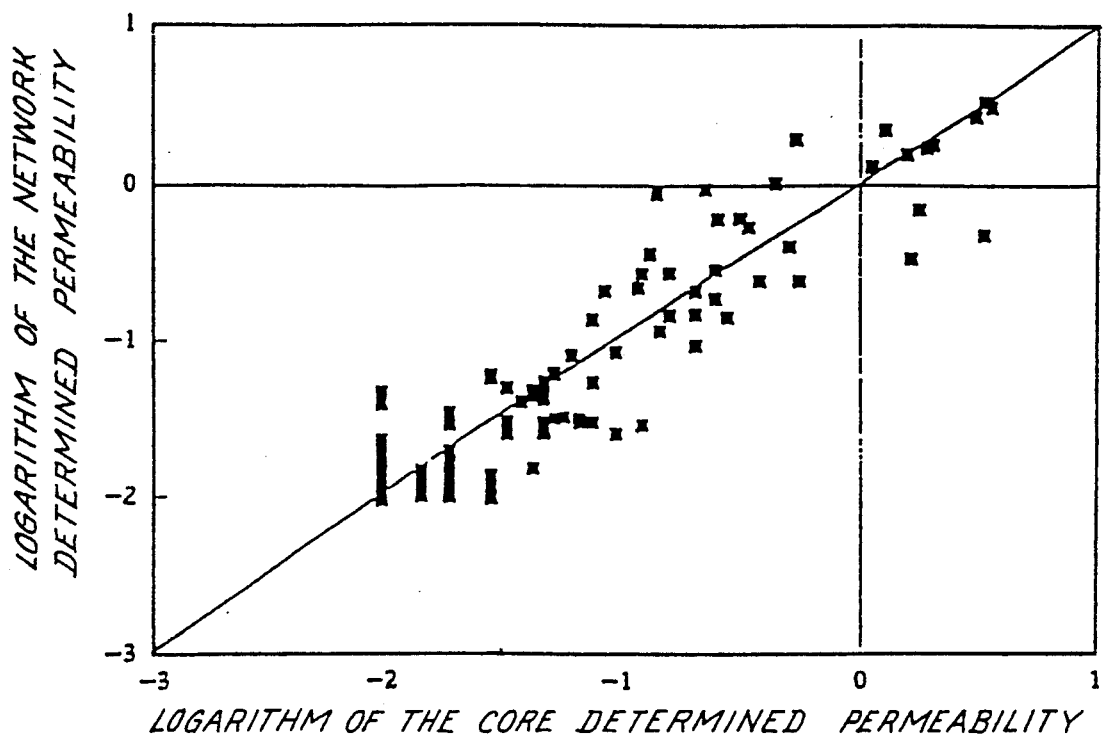
FIG. 6 is a cross plot of the neural network derived permeability and measured core permeabilities.

FIG. 5 is a plot of the core determined permeability and the permeability values calculated with this network in the training set well. FIG. 6 is a cross plot of the same data. The correlation coefficient between the core and network determined permeability data is 0.96. It is evident that the match between these two curves is much better than the match between the core determined and calculated permeabilities using conventional techniques, the results of which are given in FIGS. 8, 9, 10, and 11. The correlation coefficients associated with the two cross plots are 0.55 and 0.62 respectively. Note that the regression method involves fitting a regression line to a log (permeability in md) vs. porosity plot.

Figure 7:
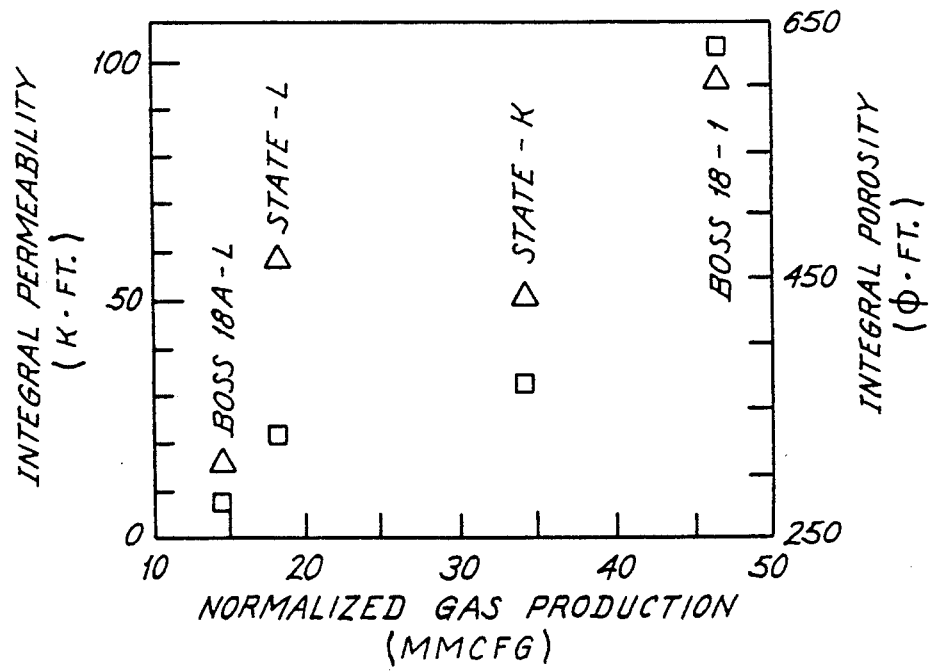
FIG. 7 is a graph comparing the neural network permeability vs. gas production and integrated porosity vs. gas production.
Figure 8:
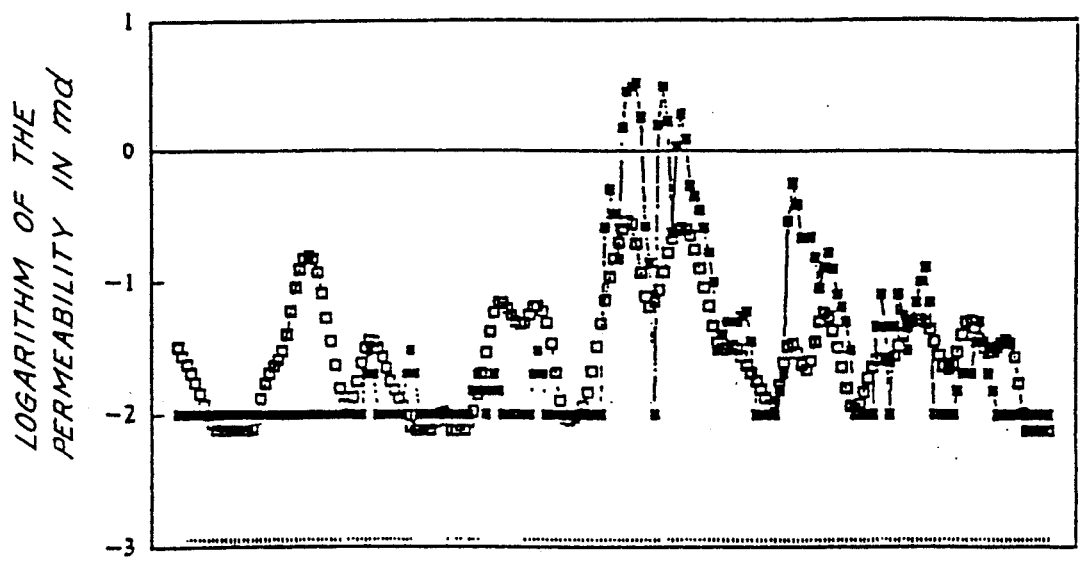
FIG. 8 is a chart comparing linear regression derived permeability from porosity and measured core permeability.
Figure 9:
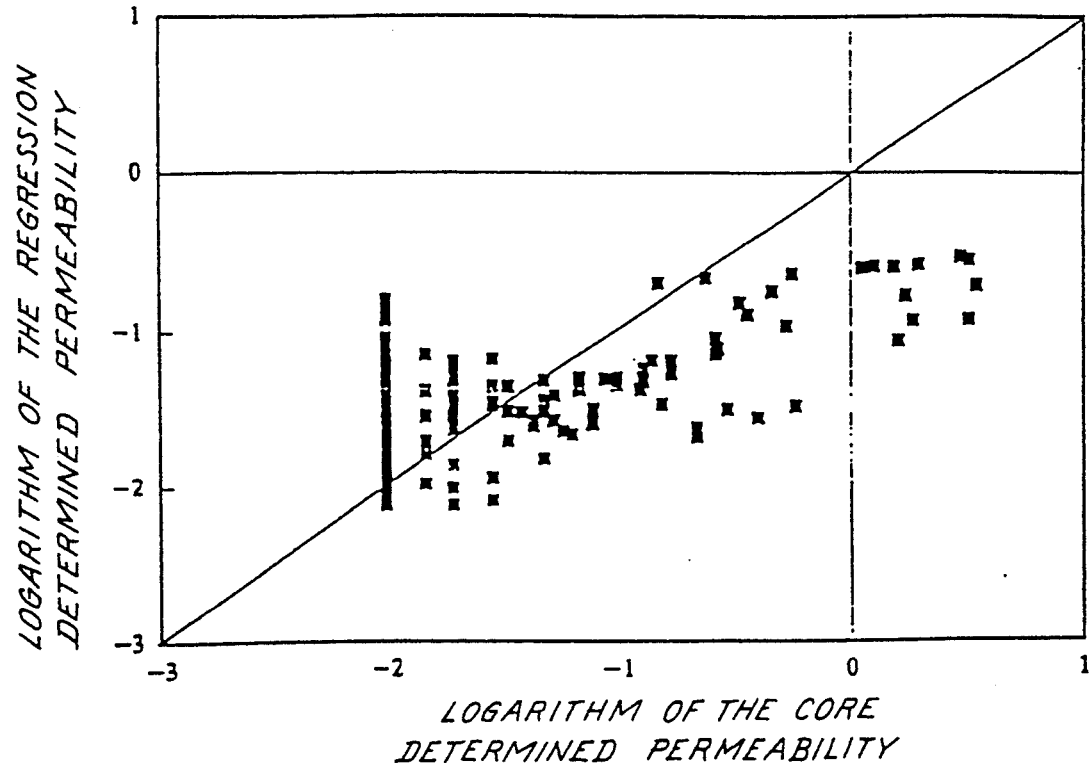
FIG. 9 is a cross plot of the linear regression derived permeability from porosity and measured core permeability.
Figure 10:
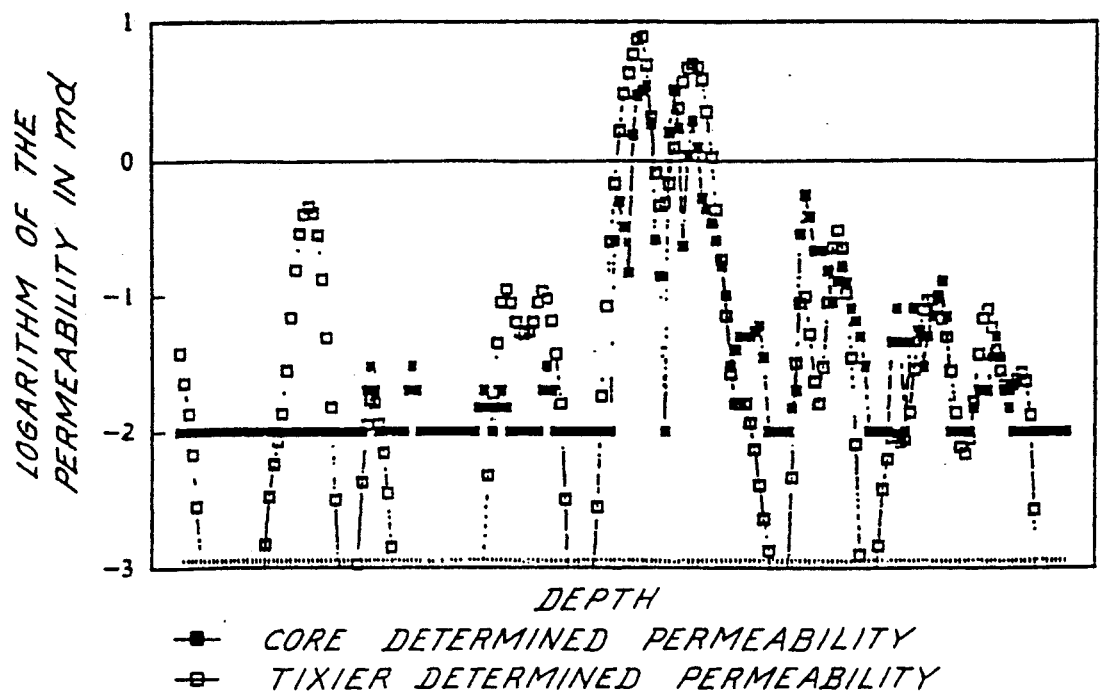
FIG. 10 is a chart comparing the Tixier method permeability and measured core permeability.
Figure 11:
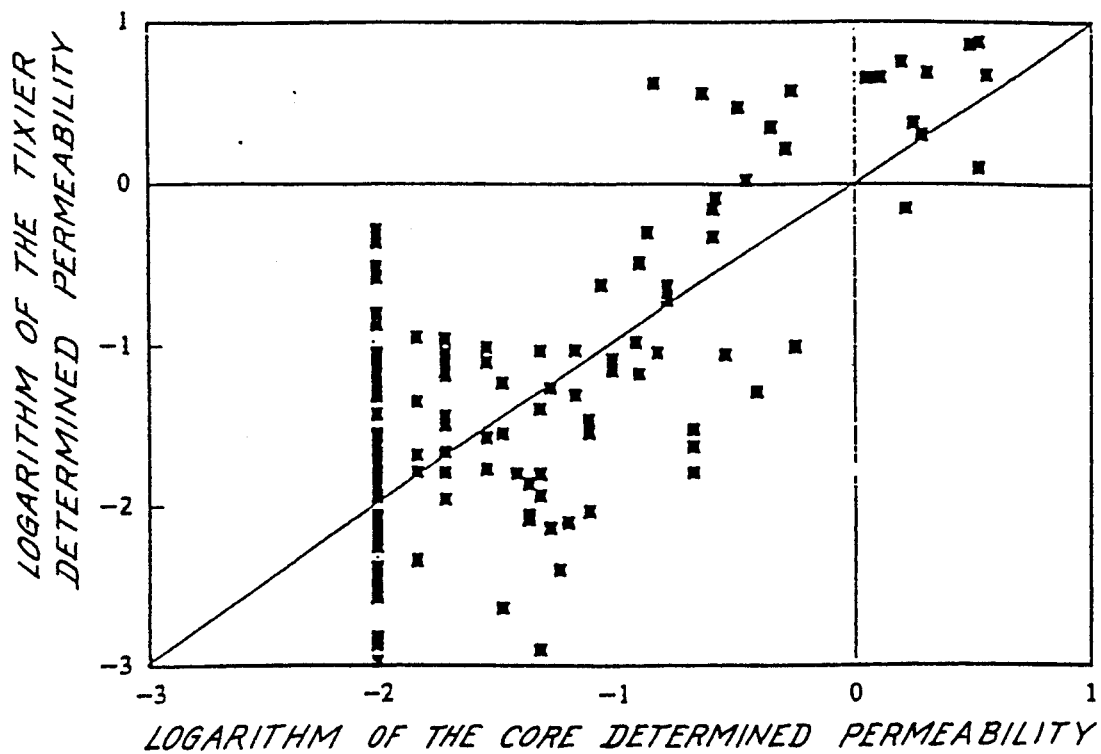
FIG. 11 is a cross plot of the Tixier method permeability and measured core permeability.

As another test of network reliability, the integrals of the network determined permeability over the perforated regions of the wells were calculated and compared with production data. A graph giving the results of these calculations along with the integrated porosity values in the same regions are given in FIG. 7. From this figure, it is evident that network calculated permeability integrals are consistent in a qualitative sense with production data whereas the porosity integrals are not. Based on these described tests, the network is believed to be reasonably accurate, and certainly more accurate than the regression and Tixier methods, both of whose results do not pass the above tests.

Finally, the network derived permeability values were consistent with available production and capillary pressure data for those wells that were not cored. This is not the case with permeability values determined using the standard statistical techniques. Based on the success experienced in this work, the possibility of developing networks to determine permeability from logs is very promising as is the opportunity for using neural networks in other areas in the petroleum industry.

The present invention may be subject to many modifications and changes without departing from the spirit or essential characteristics thereof. The present embodiment should therefore be considered in all respects as illustrative of the invention as defined by the appended claims.

We claim:

1. A method for studying formation permeability from wireline well logs utilizing a neural network having at least input, intermediate and output levels and means to supply wireline well log data to said neural network, said method comprising the steps of:
   checking wireline well log data and corresponding core permeability data for quality and accuracy and correcting said data;
   depth shifting the wireline well log data so that all the log data measurements and corresponding core data measurements are at like depth in the well;
   using resistivity, neutron porosity, bulk density, and sonic measurements, to compute total porosity, water saturation and bulk volume all as an input into the neural network;
   averaging the value of each log measurement and subtracting said average value from each log;
   using this averaged data to "train" the neural network to recognize corresponding core permeability which is likely to be encountered in the study area;
   testing the trained network on wireline log data from other wells where permeability is known from core measurements; and
   applying to the network processed well log data from other wells whereby current wireline data from an area is used to make a determination of formation permeability.

2. A method using neural networks in analyzing current well data from wireline logs for improved formation permability estimation comprising the steps of:
   providing a neural network having at least input, intermediate and output levels:
   checking wireline well log data and corresponding core permeability data for quality and accuracy and correcting said data;
   depth shifting the wireline well log date so that all log data corresponds to core data for line depth in the well;
   using resistivity, neutron porosity, bulk density, and sonic measurements, to compute total porosity, water saturation and bulk volume all as an input into the neural network;
   averaging the value of each log measurement and subtracting said averaged value from each log;
   using this averaged data to "train" the neural network to recognize corresponding core permeability which is likely to be encountered in the study area;
   testing the trained network on wireline log data from other wells where permeability is known from core measurements; and
   applying to the network processed well log data from other wells, whereby current wireline data from an area is used to make a determination of formation permeability.

3. The method according to claim 2 further comprising the step of adjusting node weights during the learning process to minimize the error between network prediction and core permeability according to the Delta Rule of learning and backpropagation as understood in the general art of neural networks.

4. The method according to claim 3 further comprising the step of:
   creating a cumulative back propagation network or a plurality of elements in the input layer, a plurality of elements in at least one hidden layer, and at least one element in an output layer.

5. The method according to claim 3 further comprising:
   assigning a linear or non-linear transfer function to the processing elements in order to achieve optimum learning through weight adjustment.

6. The method according to claim 5 wherein said non-linear transfer function is a hyperbolic tangent, sigmoid, polynomial, or other appropriate linear or non linear function.

7. The method according to claim 2 further comprising:
   allowing the network to learn for a plurality of iterations, then adjusting the weights and resuming learning for a sufficient number of iterations to assure stabilization.

8. The method according to claim 2 further comprising:
   testing the network by calculating permeability values from the input data.

9. The method according to claim 2 used for permeability determination.

10. The method according to claim 2 further comprising the step of:
    creating a cumulative back propagation network of at least one element in the input layer, at least one hidden element in said intermediate layer, and at least one element in an output layer;
    assigning a linear or non-linear transfer function to the processing elements in order to achieve optimum learning; and
    allowing the network to learn for a plurality of iterations, then adjusting the weights and resuming learning for a sufficient number of iterations to assure stability.

11. The method according to claim 10 wherein a processing element has many input paths coming into it and whose value is the sum of the incoming neuron values times their respective connection weights:

$$I_j = \Sigma W_{ji} X_i$$

where $I_j$ is termed the Internal Activation of the $j^{th}$ processing element and $W_{ji}$ is the connection weight.

12. The method according to claim 11 wherein an interval activation of this processing element is modified by a linear or non-linear transfer function which then becomes the input to the next layer of processing elements.

13. The method according to claim 12 wherein a matrix of weights are determined or adjusted in response to an input referred to as the learning rule and, back-propagation, the responsibility for reducing output error, is shared among all of the connection weights, said error first being calculated at the output layer by the difference between the desired output and the actual output, then multiplying this difference by the derivative of the transfer function:

$$E_k^{(out)} = F(I_k^{(out)}) * (D_k - O_k)$$

and using a sum of products to the previous layer, the previous PE's are then assigned proportional error computed in a fashion similar to a feed forward sum of products:

$$E_j^{(s)} = F(I_j^{(s)}) * \Sigma_k (E_k^{(s+1)} * W_{jk}^{(s+1)})$$

14. The method according to claim 13 wherein a recursive process back-propagates the error throughout the network and finally the weights are adjusted with the following formula:

$$\Delta W_{ji} = lcoef * E_j^{(s)} * X_i^{(s-1)}$$

where: lcoef = learning coefficient.

* * * * *